(12) United States Patent
Yamazaki et al.

(10) Patent No.: US 8,749,831 B2
(45) Date of Patent: Jun. 10, 2014

(54) PRINTING SYSTEM AND DATA TRANSFER METHOD

(71) Applicants: Satoshi Yamazaki, Matsumoto (JP); Shinichi Arazaki, Fujimi-machi (JP); Kohei Utsunomiya, Matsumoto (JP)

(72) Inventors: Satoshi Yamazaki, Matsumoto (JP); Shinichi Arazaki, Fujimi-machi (JP); Kohei Utsunomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/647,808

(22) Filed: Oct. 9, 2012

(65) Prior Publication Data

US 2013/0100492 A1    Apr. 25, 2013

(30) Foreign Application Priority Data

Oct. 24, 2011    (JP) ................................. 2011-232552

(51) Int. Cl.
*G06F 3/12*    (2006.01)

(52) U.S. Cl.
USPC ... 358/1.15; 358/1.14; 358/1.13; 358/426.02; 358/426.09; 358/426.01

(58) Field of Classification Search
CPC .............................. G06F 3/1293; H04L 67/06
USPC ...................... 358/426.01–426.16, 1.13–1.18
See application file for complete search history.

(56) References Cited

U.S. PATENT DOCUMENTS

| | | | | |
|---|---|---|---|---|
| 5,710,873 | A * | 1/1998 | Romano et al. | 358/1.16 |
| 5,933,576 | A * | 8/1999 | Muramatsu | 358/1.1 |
| 7,164,505 | B2 | 1/2007 | Lapstun et al. | |
| 7,209,255 | B2 * | 4/2007 | Kobayashi et al. | 358/1.15 |
| 7,324,228 | B2 * | 1/2008 | Chiarabini et al. | 358/1.15 |
| 7,460,264 | B2 * | 12/2008 | Chikuma et al. | 358/1.15 |
| 8,237,936 | B2 * | 8/2012 | Hashimoto et al. | 358/1.13 |
| 8,405,860 | B2 * | 3/2013 | Nakamura | 358/1.15 |
| 2003/0142349 | A1 * | 7/2003 | Matsunaga et al. | 358/1.15 |
| 2003/0184813 | A1 * | 10/2003 | Kobayashi et al. | 358/426.01 |
| 2003/0234954 | A1 * | 12/2003 | Hohensee et al. | 358/1.15 |
| 2004/0032620 | A1 * | 2/2004 | Tanaka et al. | 358/1.16 |
| 2011/0292445 | A1 * | 12/2011 | Kato | 358/1.15 |

FOREIGN PATENT DOCUMENTS

JP    4621766    11/2012

* cited by examiner

*Primary Examiner* — Dennis Dicker
(74) *Attorney, Agent, or Firm* — Workman Nydegger (57) ABSTRACT

A printing system provided with a printer and a host computer which transfers image data to the printer includes a data transfer unit configured to transfer the image data as image data of a first data format in the case where a connection between the printer and the host computer is first connection means, and transfer the image data as image data of a second data format in the case where a connection between the printer and the host computer is second connection means, wherein the second connection means has less data communication amount per unit time than the first connection means, and when given image data is transferred, image data of the second data format, corresponding to the given image data, has less data amount than image data of the first data format, corresponding to the given image data.

7 Claims, 7 Drawing Sheets

| CONNECTION MEANS (INTERFACE) | | TRANSFER (TRANSMISSION) RATE | COMPRESSION MEANS | DEGREE OF COMPRESSION |
|---|---|---|---|---|
| KIND | TYPE | B/S (Byte per second) | | |
| MODEM | K56flex | 7 KB/S | JPEG (LOSSY) | HIGH DEGREE COMPRESSION ↑ ↓ LOW DEGREE COMPRESSION |
| MODEM | V90 | 7 KB/S | | |
| MODEM | PHS | 8 KB/S | | |
| MODEM | ISDN | 8 KB/S | | |
| RS | 232C | 14.4 KB/S | | |
| IEEE | 1284 | 250 KB/S | | |
| RS | 422 | 1.3 MB/S | | |
| IEEE | 802.11b | 1.3 MB/S | | |
| LAN | 10 BASE-T | 1.3 MB/S | | |
| CONNECTION VIA LAN | CATV | 1.3 MB/S | | |
| USB | 1.1 | 1.5 MB/S | | |
| CONNECTION VIA LAN | CATV | 3 MB/S | | |
| CONNECTION VIA LAN | ADSL | 5 MB/S | | |
| SCSI | 1 | 5 MB/S | | |
| IEEE | 802.11a | 6.7 MB/S | | |
| IEEE | 802.11g | 6.7 MB/S | | |
| SCSI | 2 | 10 MB/S | | |
| PLC | HD-PLC | 11 MB/S | | |
| LAN | 100 BASE-TX | 12.5 MB/S | | |
| CONNECTION VIA LAN | FTTH | 12.5 MB/S | | |
| ATA | ATA | 16.7 MB/S | | |
| SCSI | 2 | 20 MB/S | PNG (LOSSLESS) | |
| ATA | DMA 33 | 33 MB/S | | |
| SCSI | 3 | 40 MB/S | | |
| IEEE | 1394 | 50 MB/S | | |
| USB | 2 | 60 MB/S | | |
| ATA | DMA 66 | 66 MB/S | | |
| IEEE | 802.11n | 75 MB/S | | |
| SCSI | 3 | 80 MB/S | | |
| ATA | DMA 100 | 100 MB/S | | |
| ATA | DMA 133 | 133 MB/S | | |
| ATA | SERIAL ATA | 150 MB/S | | |
| SCSI | 3 | 160 MB/S | | |
| CONNECTION VIA LAN | ADSL | 200 MB/S | | |
| Thunderbolt | | 1.2 GB/S | | |

PRINTING SYSTEM AND DATA TRANSFER METHOD

BACKGROUND

1. Technical Field

The present invention relates to a printing system including a data transfer apparatus, and a printing apparatus which receives image data having been transferred from the data transfer apparatus and performs printing based on the received image data.

2. Related Art

Regarding printing, there are some known technologies which enable execution of printing processing at high speed (for example, refer to Japanese Patent No. 4,621,766). Particularly, in recent years, the acceleration of speed at which a printing apparatus forms an image on a printing medium (i.e., the acceleration of an image formation speed) has been progressing.

In a printing system including a data transfer apparatus which transfers image data and a printing apparatus which receives the image data and forms an image on a printing medium, when considering the speed of a printing process (a printing speed) stating from the reception of an instruction from a user for starting the printing process until the completion of the printing process, that is, the completion of forming an image on a printing medium, along with the acceleration of the image formation speed, a rate at which the data transfer apparatus transfers image data to the printing apparatus (a data transfer rate) sometimes becomes rate limiting. For this reason, there has been a request for further accelerating the printing speed by shortening the time necessary for the data transfer.

SUMMARY

An advantage of some aspects of the invention is to provide a printing system which enables acceleration of printing speed.

In order to fulfill at least part of the request described above, the invention can take the following application examples and embodiments.

Application Example 1

A printing system provided with a printer and a host computer which transfers image data to the printer includes a data transfer unit configured to transfer the image data as image data of a first data format in the case where a connection between the printer and the host computer is first connection means, and transfer the image data as image data of a second data format in the case where a connection between the printer and the host computer is second connection means, wherein the second connection means has less data communication amount per unit time than the first connection means, and when given image data is transferred, image data of the second data format, corresponding to the given image data, has less data amount than image data of the first data format, corresponding to the given image data.

According to this printing system, the data amount of image data to be transferred is changed depending on the connection means between the host computer and the printer. In this case, in the case where the host computer and the printer is connected to each other via a connection means whose data communication amount per unit time (i.e., whose data transfer rate) is small, small-size image data resulting from reducing the data amount of given image data is transferred, thus enabling shortening of the data transfer time. Therefore, it is possible to accelerate the printing speed.

Application Example 2

In the printing system according to the application example 1, the first data format regarding the image data is a data format resulting from compressing the image data by means of first compression means, and the second data format regarding the image data is a data format resulting from compressing the image data by means of using second compression means.

According to this printing system, in the case where the host computer and the printer is connected to each other via a connection means whose data communication amount per unit time (i.e., whose data transfer rate) is small, small-size image data resulting from compressing given image data by means of the compression means is transferred, thus enabling shortening of the data transfer time.

Application Example 3

In the printing system according to the application example 2, the data transfer unit is configured to, in accordance with a connection state in each of the connection means, correct the degree of compression of the given image data in the corresponding compression means.

According to this printing system, the degree of compression in each of the compression means can be corrected in accordance with a connection state (an effective rate) of the corresponding connection means, thus enabling compression and transfer of the image data in accordance with an actual connection environment between the host computer and the printer.

Application Example 4

In the printing system according to the application example 2 or 3, the first compression means is lossless compression, and the second compression means is lossy compression.

According to this printing system, since the second compression means is lossy compression, higher data compression is made possible as compared with lossless compression, thus enabling transfer of image data resulting from further reduction of the data amount of the given image data.

Application Example 5

In the printing system according to any one of the application examples 1 to 4, the first connection means is wired communication having a data transfer rate more than or equal to 20 MB/S, and the second connection means is wireless communication having a data transfer rate less than 20 MB/S.

According to this printing system, in the case where the connection between the host computer and the printer is wireless communication whose data transfer rate is less than 20 MB/S, it is possible to transfer image data whose data amount is made smaller as compared with the case where the connection therebetween is wired communication whose data transfer rate is more than or equal to 20 MB/S.

Application Example 6

A data transfer method of transferring image data for printing from a host computer to a printer includes transferring the image data as image data of a first data format in the case where a connection between the host computer and the printer is first connection means, and transferring the image data as image data of a second data format, which has a less data amount than the image data of the first data format, in the case where the connection therebetween is second connection means whose data communication amount per unit time is less than that of the first communication means.

According to this data transfer method, the data amount of image data to be transferred is changed depending on the connection means between the host computer and the printer. In this case, in the case where the host computer and the printer is connected to each other via a connection means whose data communication amount per unit time (i.e., whose data transfer rate) is small, small-size image data resulting from reducing the data amount of given image data is transferred, thus enabling shortening of the data transfer time.

Application Example 7

A printing system includes a host computer configured to transfer image data; and a printer configured to, upon reception of the transferred image data, perform printing of an image based on the received image data. Further, the host computer and the printer are connected to each other via one of two or more connection means, and a printing image quality of an image printed by the host computer and the printer which are connected via a first one of the connection means is different from a printing quality of an image printed by the host computer and the printer which are connected via a second one of the connection means, which is different from the first one of the connection means.

According to this printing system, it is possible to cause printing image qualities of respective printed images to be different in accordance with the connection means between the host computer and the printer.

In addition, it is possible to realize the invention in various aspects. For example, the invention can be realized in any one of embodiments, such as a method and an apparatus for forming images, an image formation system, a data transfer system, a data transfer apparatus, a data transfer method, an integrated circuit and a computer program for realizing functions included the above-described systems, methods or apparatuses, or a recording medium recording the computer program therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments according to the invention will be described on the basis of the following practical examples.

A. FIRST PRACTICAL EXAMPLE (A1) Printing System

Figure 1:
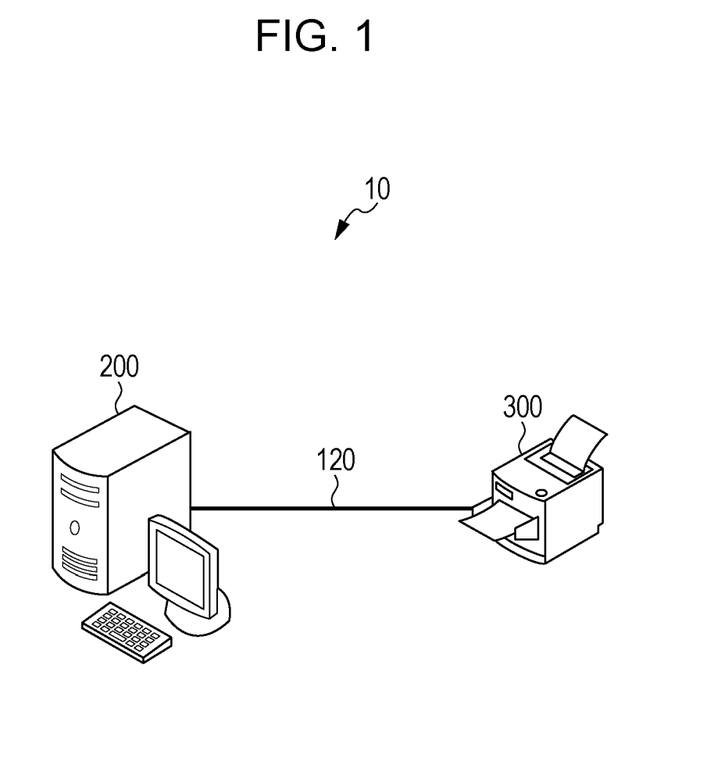
FIG. 1 is a diagram illustrating a configuration of a printing system according to a practical example of the invention.

FIG. 1 is a diagram illustrating the configuration of a printing system 10 as a practical example of the invention. The printing system 10 includes a host computer 200 and a printer 300. The host computer 200 and the printer 300 are connected to each other via a USB cable 120. The host computer 200 transfers image data for printing to the printer 300. The printer 300 performs printing of images on a printing medium on the basis of image data having been received from the host computer 200. The image data transferred to the printer 300 by the host computer 200 is data resulting from causing a printer driver of the host computer 200 to convert images, which a user has created by using a relevant application provided in the host computer 200, into data for printing (hereinafter, also referred to as printing image data). Besides, the image data may be image data the host computer 200 has acquired from outsides of the host computer 200 via an external memory or a network.

Figure 2:
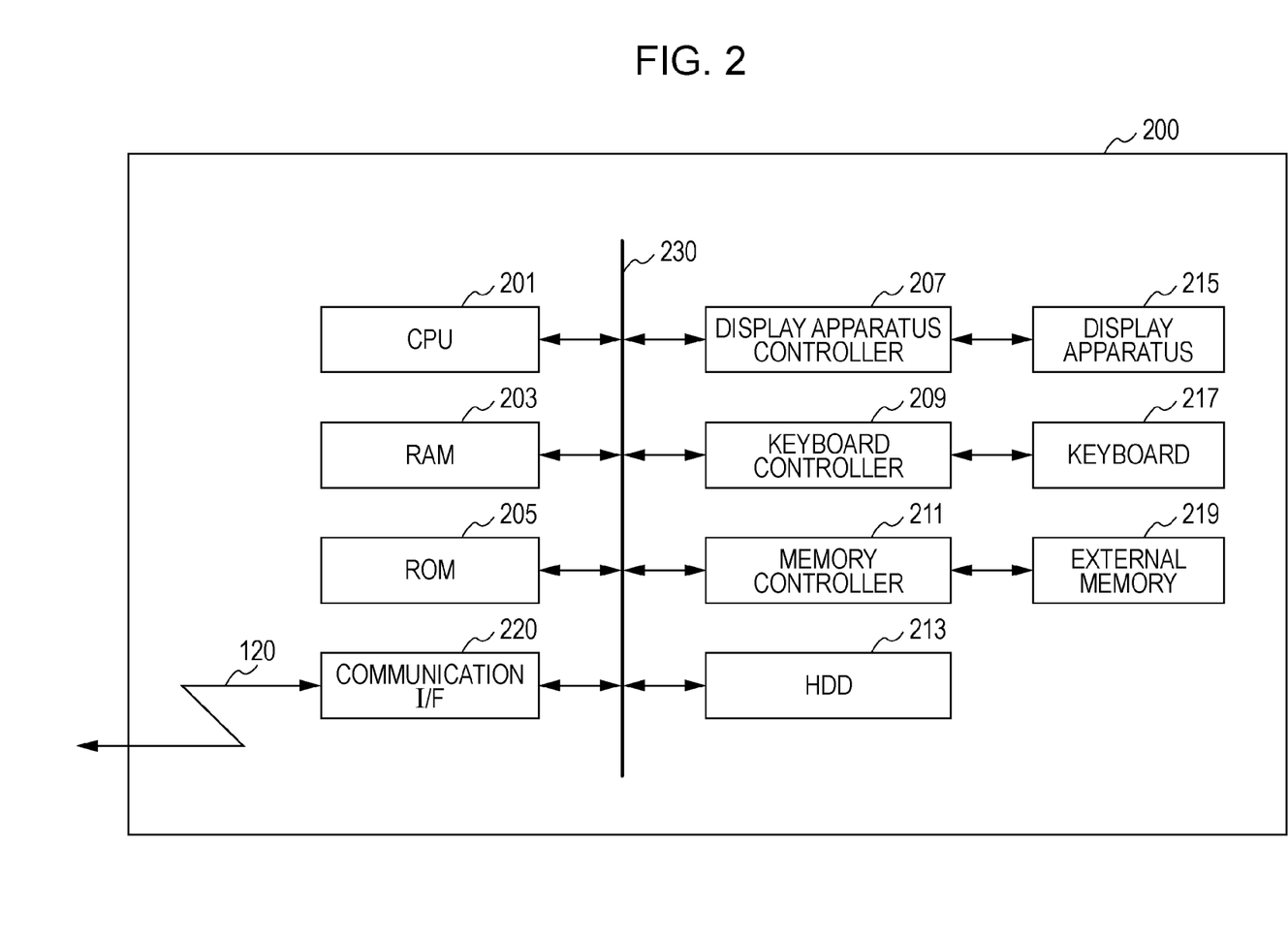
FIG. 2 is a schematic diagram illustrating a configuration of a host computer according to a practical example of the invention.

FIG. 2 is a schematic diagram illustrating the configuration of a host computer 200. The host computer includes a CPU 201, a PAM 203, a ROM 205, a display apparatus controller 207, a keyboard controller 209, a memory controller 211, a hard disk (HDD) 213, and a communication interface (I/F) 220. These individual components are connected to one another via a bus 230. A display apparatus 215 is connected to the display apparatus controller 207; a keyboard 217 is connected to the keyboard controller 209; and an external memory 219 is connected to the memory controller 211. The USB cable 120 is connected to the communication I/F 220. In this practical example, the communication I/F 220, and a communication I/F 320 which will be described below, are each compliant with the USB 2.0 specification. The USB cable 120 is a cable compliant with the USB 2.0 specification.

The CPU 201 performs control of the whole of the host computer 200. Further, the CPU 201 realizes data transfer processing described below by retrieving a data transfer program stored in the HDD 213 into the RAM 203 and executing the data transfer program. In addition, the configuration in which the host computer 200 includes the components shown in FIG. 2 is just an example, and it is possible to omit part of the components of the host computer 200 shown in FIG. 2, and/or add further components to the components of the host computer 200 shown in FIG. 2.

Figure 3:
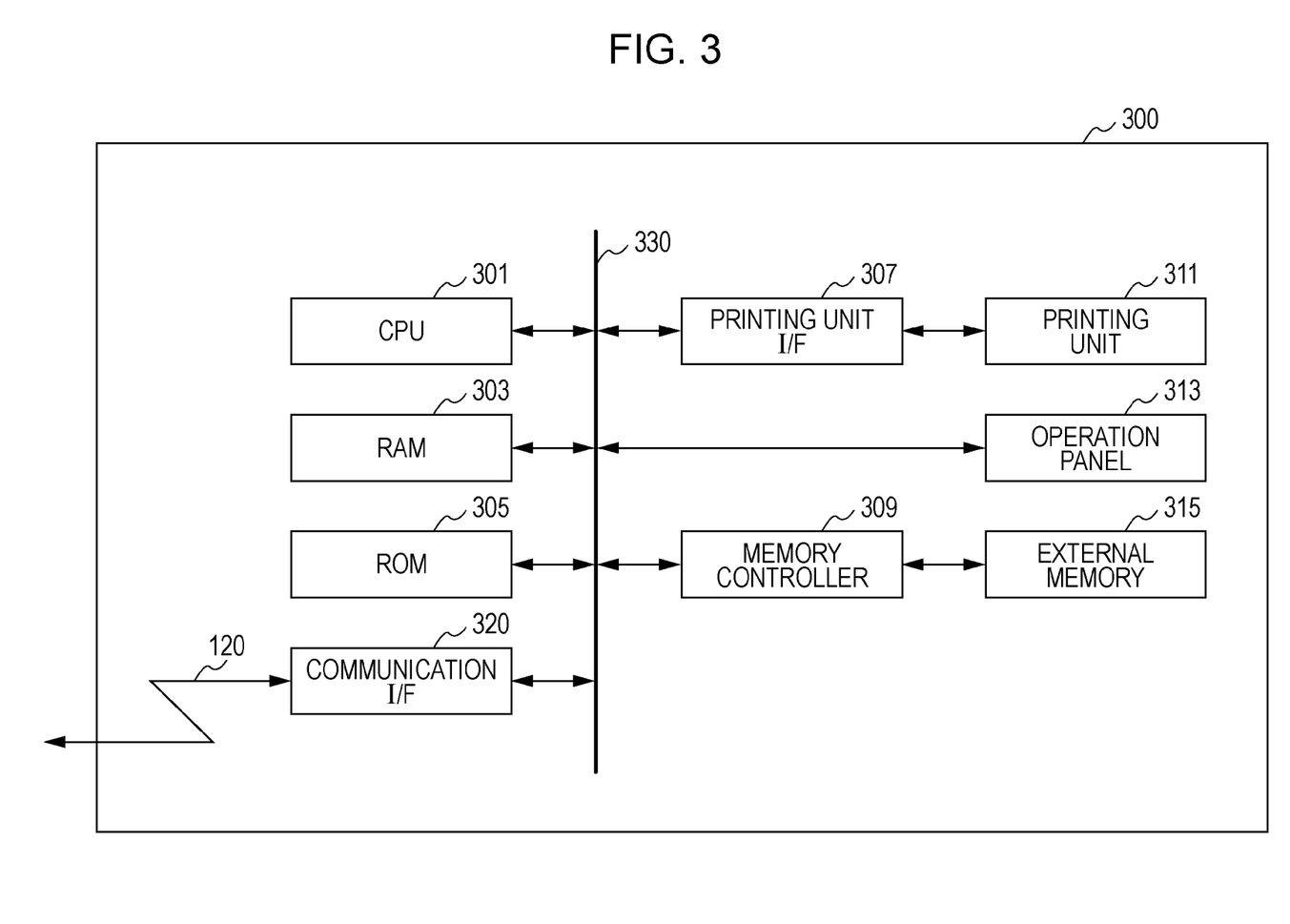
FIG. 3 is a schematic diagram illustrating a configuration of a printer according to a practical example of the invention.

FIG. 3 is a schematic diagram illustrating the configuration of the printer 300. The printer 300 is a serial type printer which performs printing using four kinds of inks such as cyan (C), magenta (M), yellow (Y) and black (K). The printer 300 includes a CPU 301, a RAM 303, a ROM 305, a printing unit interface (I/F) 307, a memory controller 309, and a communication interface (I/F) 320. These individual components are connected to one another via a bus 330. Further, a printing unit 311 is connected to the printing unit I/F 307, and an external memory 315 is connected to the memory controller 309.

The CPU 301 performs control of the whole of the printer 300. Further, the CPU 301 performs printing processing described below by retrieving a printing processing program stored in the ROM 305 into the RAM 303, and executing the printing processing program. The printing unit 311 includes function units such as ink cartridges each storing an ink therein, a printing head and a platen, which are necessary to actually form images by ejecting inks onto a printing medium. An operation panel 313 is an operation unit through which a user performs various settings regarding printing processing. A user performs settings of the kind and size of a printing medium, an operation of suspending printing processing, or the like, through the operation panel 313.

In the above-described printing system 10, when a user has issued an instruction for executing printing via the host computer 200, the host computer 200 performs data transfer processing as processing for transferring image data to the printer 300. Subsequently, the printer 300 performs printing processing for executing printing on the basis of the image data having been received from the host computer 200. Hereinafter, the data transferring processing and the printing processing will be described.

(A2) Data Transferring Processing and Printing Processing

Figure 4:
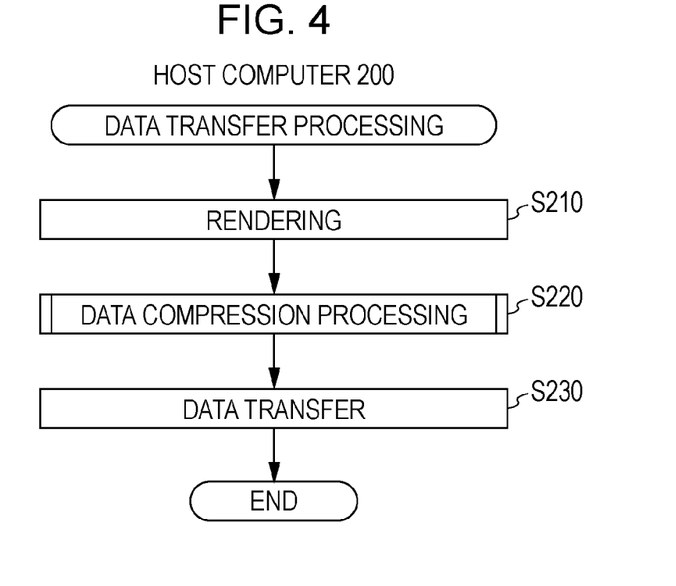
FIG. 4 is a flowchart illustrating the flow of data transferring processing according to a practical example of the invention.

FIG. 4 is a flowchart illustrating the flow of data transferring processing performed in the host computer 200. As described above, the data transferring processing is processing in which the host computer 200 transfers printing image data to the printer 300. In this practical example, a case where the printer 300 performs printing based on image data a user has created by using an application provided in the host computer 200 will be described.

The data transferring processing is started when a user has given an instruction for starting a printing process to the host computer 200. When having started the data transferring processing, the CPU 201 performs rendering processing on vector-image image data having been created by the application, and thereby creates raster-image bit-map image data (step S210). In this practical example, each pixel constituting the bit-map image data is recorded in the format of respective pieces of grayscale data corresponding to red (R), green (G) and blue (B) (hereinafter, also referred to as RGB data). After having performed the rendering processing, the CPU 201 performs data compression processing, in which image data is compressed by using a predetermined compression means, regarding image data resulting from the rendering processing (step S220). After having performed the data compression processing, the CPU 201 records information related to the compression means, which has been used when performing the data compression, into a header portion of image data resulting from the compression processing. The details of the data compression processing will be described below.

After having performed the data compression processing, the CPU 201 transfers the image data resulting from the compression processing and a printing instruction to the printer 300 via the communication I/F 220 and the USB cable 120 (step S230). Upon completion of the transfer of the image data to the printer 300, the CPU 201 terminates the data transfer processing.

Figure 5:
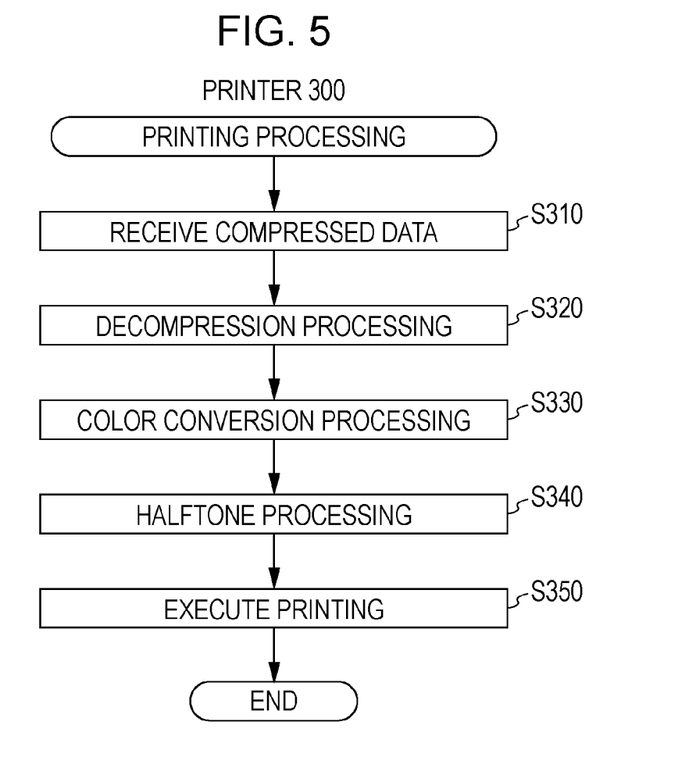
FIG. 5 is a flowchart illustrating the flow of printing processing according to a practical example of the invention.

Next, printing processing performed by the printer 300 having received image data from the host computer 200 will be described. FIG. 5 is a flowchart illustrating the flow of printing processing performed in the printer 300. The printing processing is started when the host computer 200 has received a printing instruction from the host computer 200. When having started the printing processing, the CPU 301 receives the image data resulting from the compression processing from the host computer 200 via the USB cable 120 and the communication I/F 320, and stores the compressed image data into the RAM 303 (step S310). Further, the CPU 301 retrieves the header portion of the image data having been stored in the RAM 303, and discriminates the compression means. Further, the CPU 301 performs decompression processing on the compressed image data by means of a decompression method corresponding to the compression means (step S320).

After having performed the decompression processing, the CPU 301 performs color conversion processing on the decompressed image data (step S330). The color conversion processing is processing for converting the values of the respective RGB colors (R, G and B), which are recorded in pixel data corresponding to each pixel constituting the decompressed image data, into respective pieces of ink amount data corresponding to the colors of inks (C, M, Y and K) provided in the printer 300. In this embodiment, the color conversion processing is performed by using a lookup table (hereinafter, also referred to as a color conversion LUT). The color conversion LUT is a three dimensional lookup table consisting of respective three grayscale-value axes corresponding to red (R), green (G) and blue (B), and at each of lattice points of the axes, respective pieces of ink amount data corresponding to cyan (C), magenta (M), yellow (Y) and black (K) are stored. The color conversion LUT is stored in the ROM 305, and the CPU 301 performs the color conversion processing by retrieving the color conversion LUT from the ROM 305 and applying it to the image data.

After having performed the color conversion processing, the CPU 301 performs halftone processing on the resultant image data in which each pixel is recorded in the format of the ink amount data (step S340). The halftone processing is multivalued processing for converting the image data, in which each pixel is recorded in the format of the ink amount data, into dot data in which each pixel is recorded in the format of on/off dots. In this practical example, the halftone processing is performed by means of the dither method. The dither method is a heretofore known technology, and thus, the detailed description thereof is omitted here. A dither matrix used in the dither method is stored in the ROM 305. The CPU 301 retrieves the dither matrix from the ROM 305, and performs the halftone processing by applying this dither matrix to the image data having been recorded in the format of the ink amount data.

After having performed the halftone processing, the CPU 301 executes printing on the basis of the image data having been recorded as the dot data (step S350). Specifically, the CPU 301 performs control of the operations of the printing head, platen and the like which function as the printing unit 311, and thereby, causes the individual inks of cyan (C), magenta (M), yellow (Y) and black (K) to be ejected onto a printing medium to create images thereon. In this way, the printer 300 performs the printing processing.

(A3) Data Compression Processing

Figure 6:
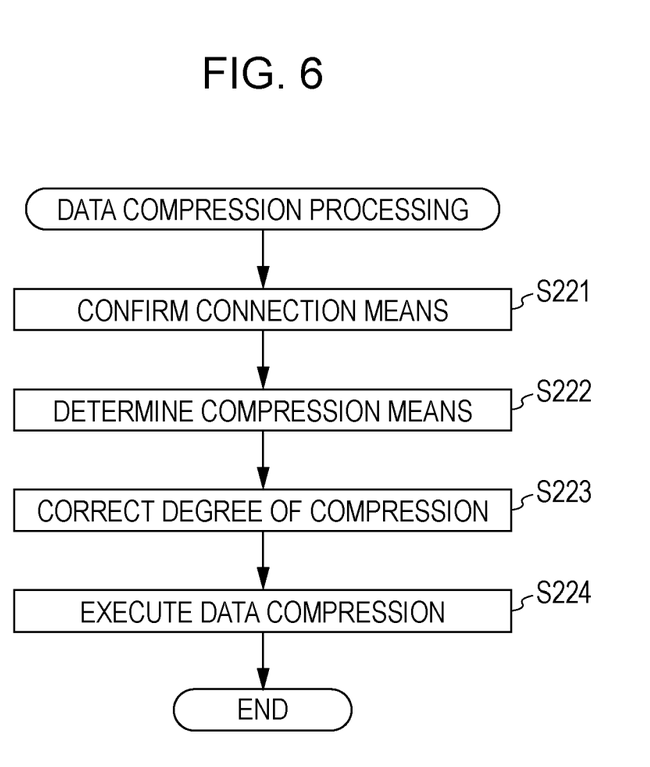
FIG. 6 is a flowchart illustrating the flow of compression processing according to a practical example of the invention.

Next, data compression processing (FIG. 4: step S220), which is performed as one processing of the data transfer processing described above, will be described. As described above, in this practical example, the data compression processing is processing for data compression of image data having been recorded in the bit-map format. FIG. 6 is a flowchart illustrating the flow of data compression processing performed by the CPU 201.

When having started the data compression processing, the CPU 201 confirms a connection means between the host computer 200 and the printer 300 (step S221). Specifically, the CPU 201 confirms a connection means which is set in the printer driver. The setting of the connection means into the printer driver is performed when a device check is performed at the start-up of the host computer 200, or when, upon connection of the printer 300 to the host computer 200 while the host computer 200 is running, the CPU 201 has recognized the type of an interface device having been connected thereto. Besides, at the start-up of the data transfer processing, the CPU 201 may recognize and confirm the connection means.

Figure 7:
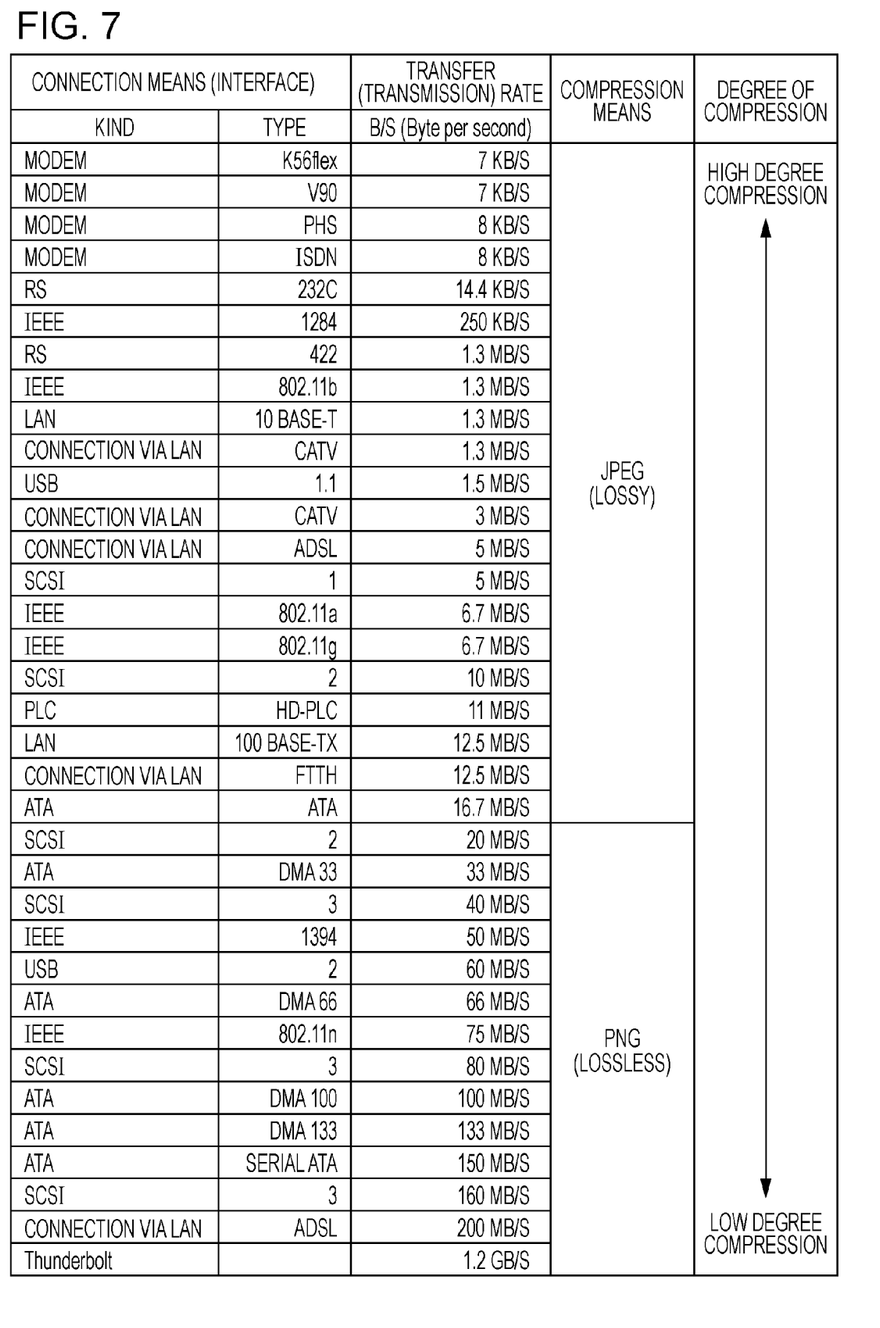
FIG. 7 is a diagram illustrating a compression means according to a practical example of the invention.

Next, the CPU 201 determines a compression means to be used for the compression of image data on the basis of the confirmed connection means (step S222). FIG. 7 is a diagram illustrating compression means the CPU 201 determines in accordance with individual connection means. As shown in FIG. 7, among connection means between the host computer 200 and the printer 300, in the case of a connection means whose transfer rate is less than a predetermined rate (in this practical example, less than 20 MB/S), image data is compressed by using a compression means based on the Joint Photographic Experts Group (JPEG) format. Further, among connection means between the host computer 200 and the printer 300, in the case of a connection means whose transfer rate is more than or equal to a predetermined rate (in this practical example, more than or equal to 20 MB/S), the image data is compressed by using a compression means based on the Portable Network Graphics (PNG) format. The compression means based on the JPEG format is a lossy compression means, and the compression means based on the PNG format is a lossless compression means.

In this practical example, the host computer 200 and the printer 300 are connected to each other via the USB cable 120 compliant with the USB 2.0 specification, and thus, the CPU determines to employ the compression means based on the PNG format. Moreover, in a group of connection means corresponding to the same compression means, the lower the transfer rate is, the higher the CPU 201 makes the degree of compression, and the higher the transfer rate is, the lower the CPU 201 makes the degree of compression.

When having determined the connection means to be used, subsequently, the CPU 201 corrects the degree of compression on the basis of the effective rate of data transfer between the host computer 200 and the printer 300 (FIG. 6: step S223). In this practical example, the CPU 201 measures the effective rate by using PING. Besides, other technologies for measuring the effective rate, such as a technology therefor using the File Transfer Protocol (FTP), may be used.

The effective rate varies depending on the path length of a connection cable connecting between the host computer 200 and the printer 300 (in this practical example, the USB cable), and noises from outsides. Besides, in the case where the connection means is a connection using a wireless LAN compliant with the IEEE 802.11g, the IEEE 802.11n or the like, the effective rate varies depending on the distance between the host computer 200 and the printer 300, and obstacles existing between the host computer 200 and the printer 300. The CPU 201 measures the effective rate, and on the basis of the measurement result, the lower the effective rate is, the higher the CPU 201 performs correction so as to make the degree of compression; while the higher the effective rate is, the lower the CPU 201 performs correction so as to make the degree of compression.

Subsequently, the CPU 201 performs the compression of image data in accordance with the determined compression means and degree of compression (step S224). Further, as described above, the CPU 201 transfers the resultant compressed image data to the printer 300. In such a way described above, the CPU 201 performs the compression processing. In addition, in FIG. 7, "Thunderbolt" is a registered trademark.

As described above, the printing system 10 in this practical example determines a compression means for image data to be transferred on the basis of a connection means between the host computer 200 and the printer 300. Moreover, as described with reference to FIG. 7, in the case of a low transfer-rate connection means, the printing system 10 performs compression of image data to be transferred so as to make the degree of the compression high, thus enabling the printing system 10 to transfer small-size image data resulting from reduction of the data amount of the image data to the printer 300. Therefore, it is possible to shorten the time necessary for data transfer. As a result, it is possible to shorten a period of time from the start of the data transfer processing until the completion of the printing processing. Furthermore, the CPU 201 corrects the degree of compression on the basis of an effective rate of the data transfer between the host computer 200 and the printer 300, thus enabling to perform data compression suitable for an actual transfer rate.

B. MODIFIED EXAMPLE

In addition, the invention is not limited to the above-described practical examples and embodiments, but can be practiced in various aspects within the scope not departing from the gist of the invention, and, for example, the following modifications can be also made.

(B1) Modification Example 1

In the above-described practical example, the JPEG and the PNG are employed as compression means used for the compression processing, but not limited to these, other compression means may be employed. For example, various compression means for image data, such as Tagged Image File Format (TIFF), Graphics Interchange Format (GIF), Portable Document Format (PDF), and run-length compression, can be employed. Further, in the above-described practical example, two kinds of compression means (the JPEG and the PNG) are made selectable, but more kinds of compression means may be made selectable. In this way, it is also possible to obtain the same advantageous effects as those of the above-described practical example.

(B2) Modification Example 2

In the above-described practical example, the compression means is made selectable from two or more kinds of compression means, but handling may be performed such that the compression means is made only one kind (for example, the JPEG), and the degree of compression is changed depending on the connection means. Specifically, in the case of a low data transfer-rate connection means, the compression of image data is performed with a high degree of compression, and in the case of a high data transfer-rate connection means, the compression of image data is performed with a low degree of compression. In this way, it is also possible to obtain the same advantageous effects as those of the above-described practical example. Moreover, by making the compression means only one, it is possible to make the compression processing simpler as compared with that of the above-described practical example.

Besides, in the case of a connection means having a data transfer rate higher than or equal to a predetermined rate, the compression may not be performed. For example, in the case where the host computer 200 and the printer 300 are connected to each other via a connection means having a data transfer rate of 200 MB/S, image data may be transferred in the bit-map format as it is without being compressed. In this way, in the case of a connection means whose transfer rate is higher than or equal to a predetermined transfer rate, it is possible to omit the data compression processing.

(B3) Modification Example 3

In the above-described practical example, image data resulting from the rendering processing is data compressed and data transferred to the printer 300, but not limited to this, processing may be performed such that, data compression processing is performed on image data having been recorded as ink amount data or image data having been recorded as dot data, and then, the resultant image data is transferred to the printer 300. This processing can be realized by, for example, performing compression processing employing a compression means based on the JPEG or the PDF, which can be also applied to image data in which each pixel is recorded in the CMYK format.

Besides, in the above-described practical example, the invention is applied to color image data (RGB data), but not limited to this, the invention can be applied to black-and-white image data. Regarding such black-and-white image data, run-length compression or facsimile data compression can be employed as the compression means. More specifically, a compression means for facsimile data compression, such as Modified Huffman (MH), Modified READ (MR), Modified Modified READ (MMR) or Joint Bi-level Image experts Group (JBIG), can be employed. In this way, it is possible to effectively compress black-and-white image data, and data transfer the resultant black-and-white image data.

(B4) Modification Example 4

Figure 8:
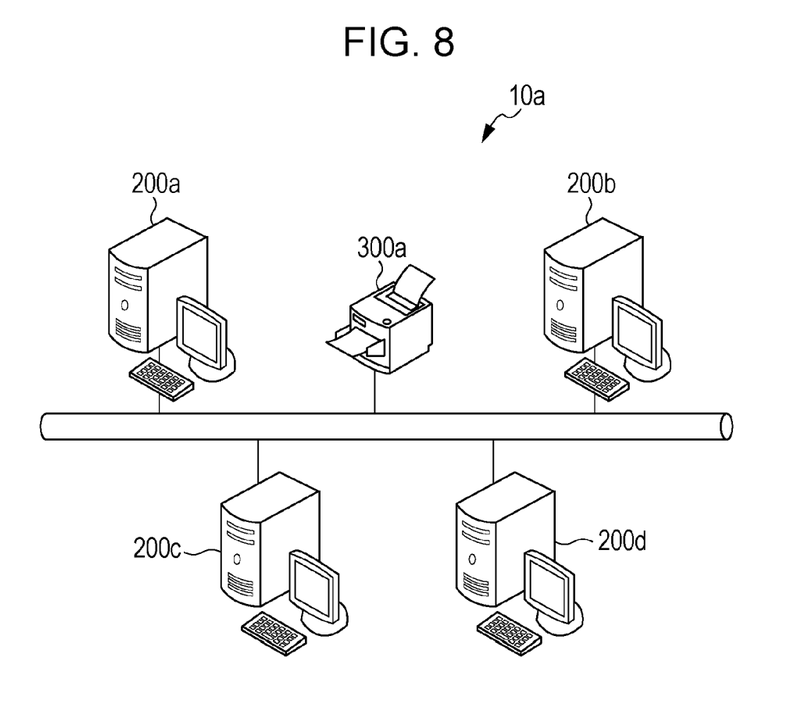
FIG. 8 is a diagram illustrating a configuration of a printing system according to another practical example of the invention.
Figure 9:
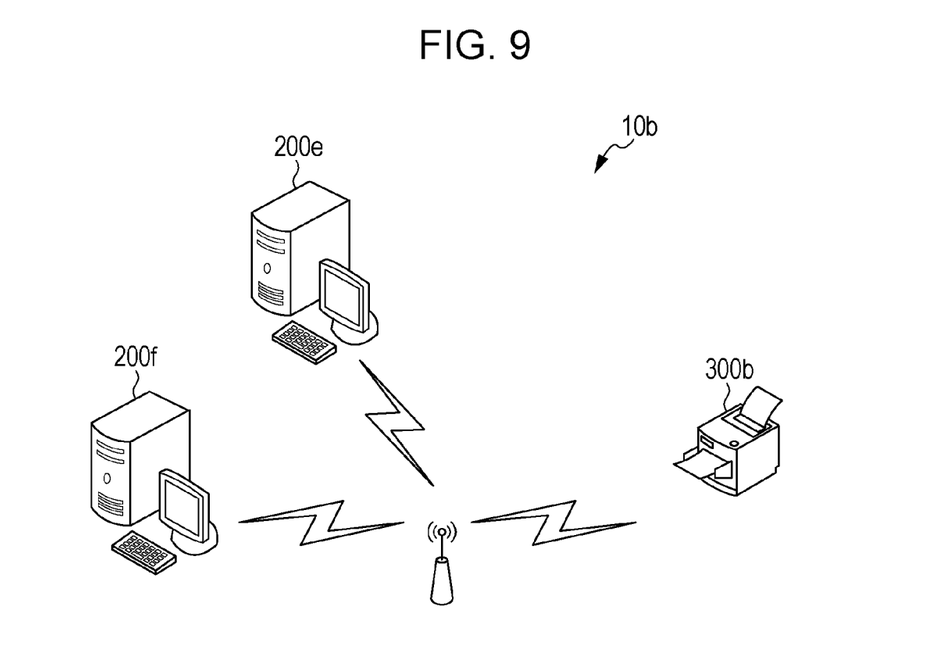
FIG. 9 is a diagram illustrating a configuration of a printing system according to a further practical example of the invention.

In the above-described practical example, a configuration, in which the host computer 200 and the printer 300 are connected to each other via a USB cable, is employed as that of the printing system 10, (refer to FIG. 1), but not limited to this configuration, various configurations may be employed. FIGS. 8 and 9 are diagrams each illustrating a specific example of the connection configuration. FIG. 8 illustrates a printing system 10a, in which host computers 200a to 200d are connected to a printer 300a via a wired LAN. In the case where, for example, 10 BASE-T is used as the wired LAN, the CPU 201 determines to employ the compression means based on the JPEG (refer to FIG. 7). Meanwhile, FIG. 9 illustrates a printing system 10b, in which host computers 200e and 200f are connected to a printer 300b via a wireless LAN. In the case where, for example, a wireless LAN compliant with the IEEE 802.11n is used as the wireless LAN, the CPU 201 determines to employ the compression means based on the PNG. In this way, it is also possible to obtain the same advantageous effects as those of the above-described practical example. Moreover, it is possible to perform compression processing suitable for each of various connection configurations.

(B5) Modification Example 5

In the above-described practical example, the printer 300 is an ink jet type serial printer, but not limited to this, the printer 300 may be a line printer, a laser printer or the like, which is a printing apparatus performing printing based on a different printing method.

(B6) Modification Example 6

Part of functions realized by software in the above-described practical example may be realized by hardware, and part of functions realized by hardware in the above-described practical example may be realized by software.

The entire disclosure of Japanese Patent Application No. 2011-232552, filed Oct. 24, 2011 is expressly incorporated by reference herein.

What is claimed is:

1. A printing system including a printer and a host computer which transfers image data to the printer, the printing system comprising:
a data transfer unit configured to transfer the image data as image data in a first data format in a case where a connection between the printer and the host computer is a first connection means, and transfer the image data as image data in a second data format in the case where the connection between the printer and the host computer is a second connection means,
wherein the second connection means has less data communication amount per unit time than the first connection means, and when given image data is transferred, image data in the second data format, corresponding to the given image data, has less data amount than image data of the first data format, corresponding to the given image data,
wherein the data transfer unit determines an effective rate of data transfer in the case of the first connection means and an effective rate of data transfer in the case of the second connection means and
wherein the data transfer unit adjusts a degree of the first data format based on the effective data rate of the first connection means or a degree of the second data format based on the effective rate of data transfer of the second connection means.

2. The printing system according to claim 1, wherein the first data format regarding the image data is a data format resulting from compressing the image data by means of first compression means, and the second data format regarding the image data is a data format resulting from compressing the image data by means of second compression means.

3. The printing system according to claim 2, wherein the data transfer unit is configured to, in accordance with a connection state in each of the connection means, correct the degree of compression of the image data in the corresponding compression means.

4. The printing system according to claim 2, wherein the first compression means is lossless compression, and the second compression means is lossy compression.

5. The printing system according to claim 1, wherein the first connection means is wired communication having a data transfer rate more than or equal to 20 MB/S, and the second connection means is wireless communication having a data transfer rate less than 20 MB/S.

6. A data transfer method of transferring image data for printing from a host computer to a printer, the data transfer method comprising:
transferring the image data as image data in a first data format in the case where a connection between the host computer and the printer is a first connection means,
transferring the image data as image data in a second data format, which has less data amount than the image data of the first data format, in the case where the connection therebetween is a second connection means whose data communication amount per unit time is less than that of the first communication means, determining an effective rate of data transfer in the case of the first connection means and in the case of the second connection means;

adjusting a degree of the first data format based on an effective rate of data transfer of the first connection means in the case of the first connection means or a degree of the second data format based on an effective data transfer rate of the second connection means in the case of the second connection means.

7. A printing system comprising:

a host computer configured to transfer image data; and a printer configured to, upon reception of the transferred image data, perform printing of an image based on the received image data, wherein the host computer and the printer are connected to each other via one of two or more connection means, and wherein a printing image quality of an image printed by the host computer and the printer which are connected via a first one of the connection means is different from a printing quality of an image printed by the host computer and the printer which are connected via a second one of the connection means, which is different from the first one of the connection means, wherein an effective rate of data transfer is determined by the host computer between the host computer and the printer, wherein a degree of compression of the transferred image data is adjusted according to the effective data transfer rate of the one of the two or more connection means over which the image data is transferred.

* * * * *